United States Patent Office 3,548,307
Patented Dec. 15, 1970

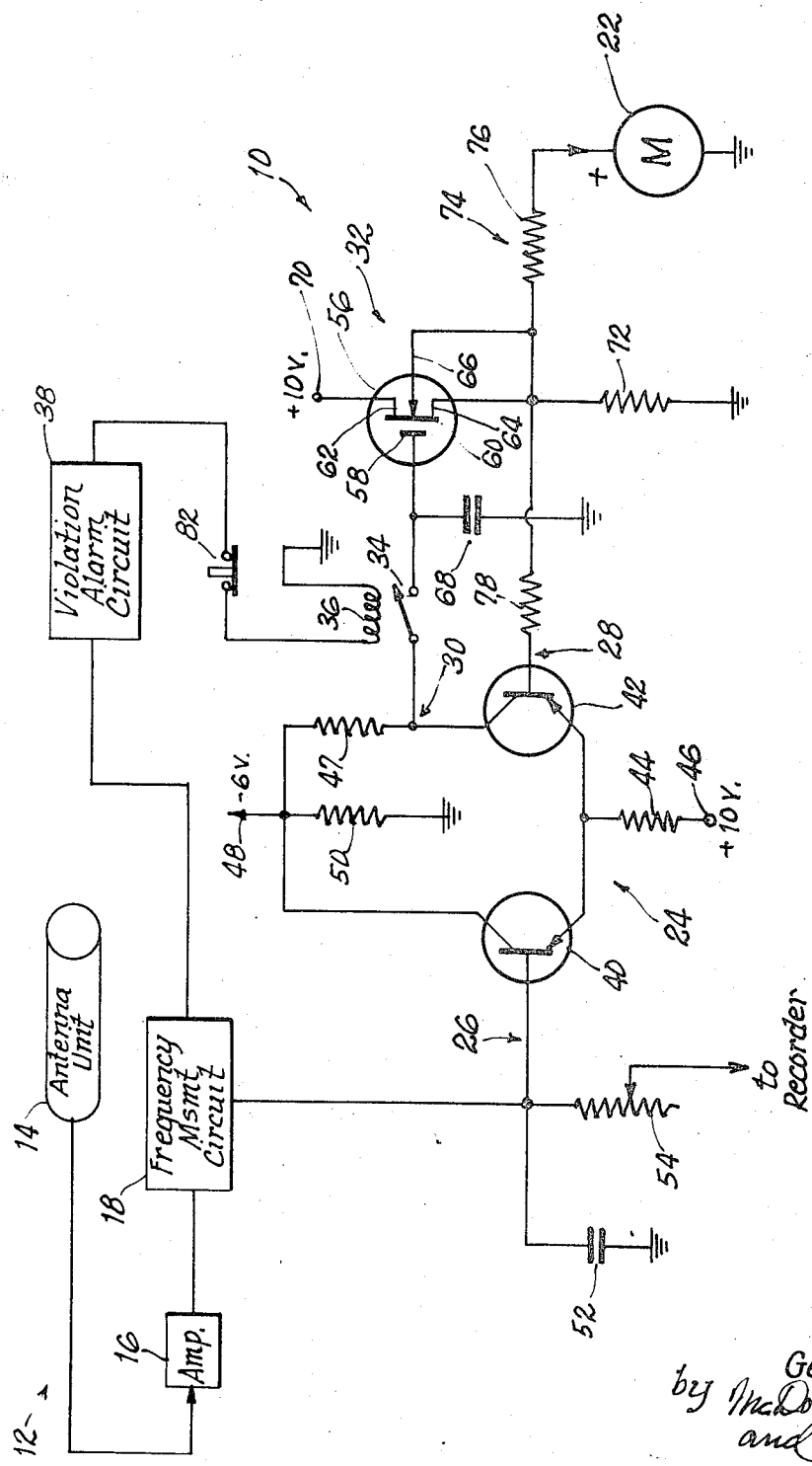

3,548,307
ELECTRONIC HOLDING CIRCUIT
George H. Fathauer, Decatur, Ill., assignor to Qonaar Corporation, a corporation of Delaware
Filed Aug. 8, 1968, Ser. No. 751,239
Int. Cl. G01p *3/12;* G01r *19/16*
U.S. Cl. 324—103                     12 Claims

ABSTRACT OF THE DISCLOSURE

An electronic circuit for holding a reading corresponding to a variable input signal from a radar set or the like, comprising a comparison amplifier having first and second input circuits, means for supplying the input signal to said first input circuit, said comparison amplifier including an output circuit, a meter circuit connected to said second input circuit, a feed-back loop connected between said output circuit of said comparison amplifier and said second input circuit, said feed-back circuit including a field effect transistor having its control electrode connected to said output circuit of said comparison amplifier, said field effect transistor having its output electrode connected to said second input for producing a meter signal in said meter circuit corresponding to the input signal in the first input circuit, a capacitor connected to the control electrode of the field effect transistor, and a switch for opening the connection between the output circuit of said amplifier and the control electrode, whereby the capacitor maintains the voltage on the control electrode so that the signal in the meter circuit is held at the value which was existing when the switch was open.

---

This invention relates to electronic indicating and measuring circuits, in which a meter or some other indicating device is operated by a variable signal. An example of such an arrangement can be found in a radar set for measuring the speed of automobiles or other vehicles. Such a radar set generally produces an output signal for operating a meter which indicates the speed of the vehicle which is under the surveillance of the radar beam. Any particular vehicle is normally under surveillance for only a few seconds, so that the output signal from the radar set is subject to rapid variations. Thus, the readings of the output meter are of a fleeting character. If a speed violation is observed, the reading of excessive speed on the meter may occur for only a very short period of time, before the reading is lost, due to various factors, such as the movement of another vehicle into the radar beam.

The general object of the invention is to provide an electronic holding circuit, whereby a meter reading of a variable input signal may be held, in response to the operation of a push-button switch by the operator, or in response to an automatic violation alarm device, so that the reading will be preserved as long as may be desired by the operator. In this way, an accurate observation to establish a speed violation may readily be made.

In accordance with the present invention, the electronic holding circuit preferably includes a comparison amplifier having first and second input circuits. The first input circuit is adapted to receive the signal which is to be measured. The meter or other measuring device is connected to the second input circuit. A feed-back loop is connected between an output circuit of the comparison amplifier and the second input circuit thereof, so as to develop a meter signal in the second input circuit, corresponding to the variable input signal in the first input circuit. The feed-back loop includes a field effect transistor having its output electrode connected to the second input circuit. The control electrode of the field effect transistor is connected to the output circuit of the comparison amplifier, through a switch which may be opened to interrupt the feed-back loop. A storage capacitor is connected to the control electrode of the field effect transistor. The switch may either be opened until the manual control of the operator, or in response to an automatic violation alarm. When the switch is opened, the capacitor maintains the voltage then existing on the control electrode, so that the existing meter signal is held. Thus, the output meter reading is held steady until the switch is again closed to reactivate the feed-back loop.

Further objects, advantages and features of the invention will appear from the following description, taken in connection with the accompanying drawing, in which the single figure is a schematic wiring diagram of an electronic holding circuit to be described as an illustrative embodiment of the present invention.

The embodiment illustrated in the drawing comprises an electronic holding circuit 10 which is intended particularly for use with a speed measuring radar set 12, but will also find various other applications, particularly in situations where a variable signal is to be measured.

The radar set 12 is of the known type, often used by police officers as an aid in the enforcement of speed limits for automobiles and other vehicles. The radar set is capable of measuring the speed of any vehicle which is brought under the surveillance of the radar beam. The speed may be read on a meter or other instrument.

Thus, the radar set 12 comprises an antenna unit 14 which produces a radar beam, comprising radio waves at an ultra high frequency. The beam is reflected by any vehicle which moves into the beam. The reflected beam is picked up by the antenna unit 14. Due to the well known Doppler effect, the radio waves reflected from the moving vehicles are at a slightly different frequency from the frequency of the incident waves produced by the radar set. If the vehicle is traveling toward the radar set, the frequency of the reflected waves is slightly greater than the transmitted frequency. If the vehicle is traveling from the radar set, the reflected frequency is slightly less than the transmitted frequency. The antenna unit 14 mixes the reflected signal with a portion of the transmitted signal to produce a beat frequency signal which is in the audio range. This signal has a frequency corresponding to the difference between the reflected and transmitted radio signals.

The beat frequency or difference signal is fed through an amplifier 16 to a frequency measurement circuit 18 having an output circuit 20. In this case, the frequency measurement circuit 18 develops a direct current output signal having a magnitude corresponding to the frequency of the difference signal. In the usual type of radar set, this direct current output signal is fed directly to a meter or some other measuring instrument. Thus, the reading on the meter indicates the speed of the vehicle.

In the illustrated arrangement, however, the electronic holding circuit 10 is interposed between the output circuit 20 and the meter 22. The circuit 10 makes it possible to hold the meter reading at any time, as desired by the operator, so that the meter can be read with the utmost accuracy. If a speed violation occurs, the operator can hold the reading on the meter 22 so that the excessive speed can be established beyond doubt.

In this case, the electronic holding circuit 10 comprises a comparison amplifier 24 having first and second input circuits 26 and 28. The output circuit 20 of the frequency measuring device 18 is connected to the first input circuit 26. The meter 22 is connected to the second input circuit 28. The comparison amplifier 24 has an output circuit 30. A feed-back loop 32 is connected between the output circuit 30 and the second input circuit 28. This arrangement has the effect of producing a signal in the second input circuit 28, corresponding exactly, or nearly so, to the input signal from the frequency measurement circuits 18. Thus, the reading on the meter 22 is the same as if the meter were connected directly to the frequency measurement circuits 18.

A switch 34 is provided to open the feed-back loop 32, which has the effect of holding the meter reading at the value then existing. Thus, it is easy to read the meter with complete accuracy. When the switch 34 is closed, the feed-back loop is restored, so that the meter 22 again follows the input signal from the frequency measurement circuits 18.

The switch 34 may be operated manually, or by a relay coil 36. In this case, the relay coil 36 is connected to a violation alarm circuit 38, which may be of any known or suitable type. The violation alarm circuit 38 de-energizes the relay coil 36 and causes the switch 34 to open, when the output of the frequency measurement circuit exceeds a pre-set level, corresponding to the speed limit. It will be seen that the violation alarm circuit 38 is connected between the frequency measurement circuit 18 and the relay coil 36. When a violation occurs, the switch 34 is automatically opened by the violation alarm circuit 38.

As to further details of the electronic holding circuit 10, the illustrated comparison amplifier comprises two transistors 40 and 42. The input circuits 26 and 28 are connected to the bases of the transistors 40 and 42. A common load resistor 44 is connected between a positive power supply terminal 46 and the emitters of both transistors 40 and 42. This resistor 44 provides coupling between the two transistors 40 and 42.

The output circuit 30 is connected to the collector of the second transistor 42. A load resistor 47 is connected between such collector and a negative power supply terminal 48. As indicated in the drawings, the positive supply terminal 46 may be at 10 volts to ground while the negative supply terminal is at 6 volts to ground, making a total of 16 volts between the two terminals. In the illustrated arrangement, a resistor 50 is connected between the terminal 48 and ground. The collector of the first transistor 40 is connected directly to the negative power supply terminal 48.

In the first input circuit 26, the output signal from the frequency measurement circuit 18 is supplied directly to the base of the transistor 40. A filtering capacitor 52 is connected between the base and ground. The output signal may also be supplied to a recorder, through a variable calibrating resistor 54, connected to the base of the transistor 40.

In the illustrated arrangement, the feed-back loop 32 comprises a field effect transistor 56 having an insulated control electrode or gate 58, a base 60 and two output electrodes 62 and 64. The transistor 56 also has a substrate terminal 66 which is insulated from the other terminals. As shown, the insulated gate 58 is connected through the switch 34 to the collector of the transistor 42. A storage capacitor 68 is connected between the insulated gate 58 and ground.

The first output electrode 62 is connected to a positive power supply terminal 70. A load resistor 72 is connected between the second output electrode 64 and ground. In this case, the substrate terminal 66 is connected to the second output electrode 64.

The load resistor 72 may be considered to be part of a metering circuit 74 which also includes the meter 22. Thus, the meter 22 and a calibrating resistor 76 are connected in series across the load resistor 72.

The resistor 72 is also connected into the second input circuit 28 of the comparison amplifier 24. Thus, a current limiting resistor 78 is connected between the ungrounded ends of the resistor 72 and the base of the transistor 42.

The effective resistance between the first and second output terminals 62 and 64 of the field effect transistor 56 is varied in accordance with the voltage applied to the gate 58. Thus, an output voltage is developed across the load resistor 72. The gate 58 does not draw any current, because the gate is insulated from the other electrodes of the transistor 56.

In the operation of the electronic holding circuit 10, the input signal, derived from the frequency measurement circuit 18, is amplified by the transistors 40 and 42, and also by the field effect transistor 56 in the feedback loop 32. The output voltage of the field effect transistor 56 is developed across the load resistor 72 and is applied to the meter 22. Such output voltage is also applied to the second input circuit 28 of the comparison amplifier. The original signal, applied to the first input circuit 26, tends to upset the balance between the two transistors 40 and 42, so that one becomes more conductive than the other. On the other hand, the feed-back voltage, developed across the resistor 72, tends to restore the balance. Due to the high gain of the circuit, the balance is almost perfectly restored, so that the voltage across the load resistor 72 corresponds very closely to the voltage applied to the first input circuit 26.

As long as the switch 34 is closed, the voltage across the resistor 72 follows the variations of the voltage across the input circuit 26. Thus, the meter 22 produces readings which reflect the variations in the input voltage.

When it is desired to hold a particular reading, the switch 34 is opened. This interrupts the feed-back loop 32, so that the capacitor 68 maintains the existing voltage on the gate or control electrode 58. Due to the fact that the gate draws no current, the voltage on the gate remains unchanged, as long as the switch 34 is open. Thus, the meter voltage across the resistor 72 remains unchanged, at the value which existed when the switch 34 was opened. Accordingly, the meter 22 produces a steady, unchanging indication, which can be read with complete accuracy.

When the switch 34 is again closed, the feed-back loop is re-established so that the meter voltage across the resistor 72 will follow the input voltage at the base of the transistor 40.

The relay coil 36 controls the opening and closing of the switch 34. To provide automatic control, the violation alarm circuit is adapted to de-energize the relay coil 36 so that the switch 34 will be opened when the input signal rises to an excessive value, indicating a speed violation. To provide for manual control, a normally closed pushbutton switch 82 may be connected in series with the relay coil 36. By operating the switch 82, the relay coil 36 may be de-energized, so as to open the switch 34. The reading on the meter 22 will then be held, so that it may easily be noted and recorded.

It will be evident that the electronic holding circuit can provide very effective operation, yet with a minimum of complexity. The circuit is highly reliable, yet low in cost.

Those skilled in the art will understand that the values of the various components, employed in the illustrative embodiment may be varied widely to suit various conditions. For the sake of complete understanding, however, it may be helpful to offer the following table, showing one set of appropriate values, by way of example:

| Resistor: | Value in ohms |
|---|---|
| 44 | 12K |
| 47 | 39K |
| 50 | 10K |
| 54 | 10K |
| 72 | 1K |
| 76 | (¹) |
| 78 | 47K |

| Capacitor: | Value in microfarads |
|---|---|
| 52 | .47 |
| 68 | .47 |

¹ Selected to calibrate meter.

Various other modifications, alternative constructions, and equivalents may be employed without departing from

I claim:
1. An electronic holding circuit, comprising
   a comparison amplifier having first and second input circuits,
   said amplifier having an output circuit,
   means for applying a variable input signal to said first input circuit,
   a metering circuit connected to said second input circuit,
   a feed-back loop connected between said output circuit and said second input circuit for developing a metering signal in said metering circuit corresponding to said input signal,
   said feed-back loop comprising a signal storage device and an electronic amplifying device having an insulated control electrode connected to said output circuit and the storage device,
   said amplifying device having an output electrode connected to said second input circuit,
   means responsive to a variable input signal exceeding a pre-set level to produce an alarm signal,
   and switching means responsive to the alarm signal for interrupting the connection between said output circuit and said storage device and said insulated control electrode so as to hold the metering signal then existing in said metering circuit.

2. A holding circuit according to claim 1, in which said amplifying device is in the form of a field effect transistor having an insulated gate serving as said control electrode.

3. A holding circuit according to claim 1, wherein said storage device comprises a capacitor connected to said insulated control electrode for maintaining the voltage thereon when the connection to said control electrode is interrupted by said switching means.

4. A holding circuit according to claim 2, including a capacitor connected to said insulated gate for maintaining the voltage thereon when the connection to said gate is interrupted by said switching means.

5. A holding circuit according to claim 1, in which said metering circuit includes a load resistor connected to said output electrode of said amplifying device for developing a metering signal corresponding to the input signal.

6. A holding circuit according to claim 1,
   in which said comparison amplifier comprises first and second transistors,
   said first and second input circuits being connected to the bases of said transistors,
   said output circuit being connected to the collector of one of said transistors.

7. A holding circuit according to claim 6, including a common coupling resistor connected to the emitters of both of said transistors.

8. A holding circuit according to claim 1, in which said switching means include a relay coil, and a switch operable by said relay coil.

9. A holding circuit according to claim 1,
   in which comparison amplifier comprises first and second transistors having input electrodes connected to said first and second input circuits,
   said transistors having output electrodes,
   said output circuit being connected to one of said output electrodes,
   and coupling means connected between said transistors.

10. A holding circuit according to claim 9,
    in which said amplifying device is in the form of a field effect transistor having an insulated gate connected through said switching means to said output circuit,
    said field effect transistor having an output electrode connected to said second input circuit and also to said metering circuit.

11. A holding circuit according to claim 10, wherein said storage device comprises a capacitor connected to said insulated gate of said field effect transistor to maintain the voltage on said gate upon the opening of said switching means.

12. A holding circuit according to claim 10,
    in which said metering circuit comprises a load resistor connected to said output electrode of said field effect transistor,
    and a meter connected to said load resistor.

References Cited

UNITED STATES PATENTS

| | | | |
|---|---|---|---|
| 2,468,687 | 4/1949 | Schmitt | 324—111X |
| 3,116,458 | 12/1963 | Margopoulos | 328—151X |
| 3,413,491 | 11/1968 | Reeves et al. | 324—103X |

RUDOLPH V. ROLINEC, Primary Examiner

E. F. KARLSEN, Assistant Examiner

U.S. Cl. X.R.

324—70, 111; 340—263